(12) United States Patent
Koike

(10) Patent No.: US 10,353,391 B2
(45) Date of Patent: Jul. 16, 2019

(54) TRAVEL CONTROL DEVICE

(71) Applicant: HONDA MOTOR CO., LTD, Minato-ku, Tokyo (JP)

(72) Inventor: Masaki Koike, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/693,721

(22) Filed: Sep. 1, 2017

(65) Prior Publication Data

US 2018/0074498 A1 Mar. 15, 2018

(30) Foreign Application Priority Data

Sep. 9, 2016 (JP) ................. 2016-176539

(51) Int. Cl.
*G05D 1/00* (2006.01)
*G05D 1/02* (2006.01)
*G08G 1/16* (2006.01)

(52) U.S. Cl.
CPC ........... *G05D 1/0088* (2013.01); *G05D 1/021* (2013.01); *G08G 1/166* (2013.01); *G05D 2201/0213* (2013.01)

(58) Field of Classification Search
CPC ................. G05D 1/0088; G05D 1/021; G05D 2201/0213; G08G 1/166
See application file for complete search history.

(56) References Cited

U.S. PATENT DOCUMENTS

2016/0207538 A1* 7/2016 Urano ................. B60W 30/182
2016/0288707 A1* 10/2016 Matsumura ............. B60Q 9/00
2017/0364072 A1* 12/2017 Yako ..................... B60W 50/00
2018/0037260 A1* 2/2018 Otake .................. B62D 15/025
2018/0046185 A1* 2/2018 Sato ........................ B62D 1/286
2018/0059661 A1* 3/2018 Sato ....................... B60W 40/04

FOREIGN PATENT DOCUMENTS

| JP | 2005-138748 | 6/2005 |
| JP | 2007-219743 | 8/2007 |
| JP | 2012-116366 | 6/2012 |
| JP | 2015-153153 | 8/2015 |

OTHER PUBLICATIONS

Harada et al., JP 2012116366, Jun. 21, 2012 (machine translation).*
Japanese Office Action for Japanese Patent Application No. 2016-176539 dated Feb. 27, 2018.
Japanese Office Action for Japanese Patent Application No. 2016-176539 dated Jul. 24, 2018.

* cited by examiner

*Primary Examiner* — Courtney D Heinle
(74) *Attorney, Agent, or Firm* — Amin, Turocy & Watson LLP

(57) ABSTRACT

A travel control device sets a limitation in relation to traveling of a vehicle during automatic driving. Further, compared with a case in which the vehicle is not in a stopped state or not in a slowly traveling state, or a case in which the vehicle velocity is in excess of a vehicle velocity threshold value by which the stopped state or the slowly traveling state is determined, the travel control device alleviates the limitation in a case in which the vehicle is in the stopped state or in the slowly traveling state, or in a case in which the vehicle velocity is lower than the vehicle velocity threshold value.

7 Claims, 6 Drawing Sheets

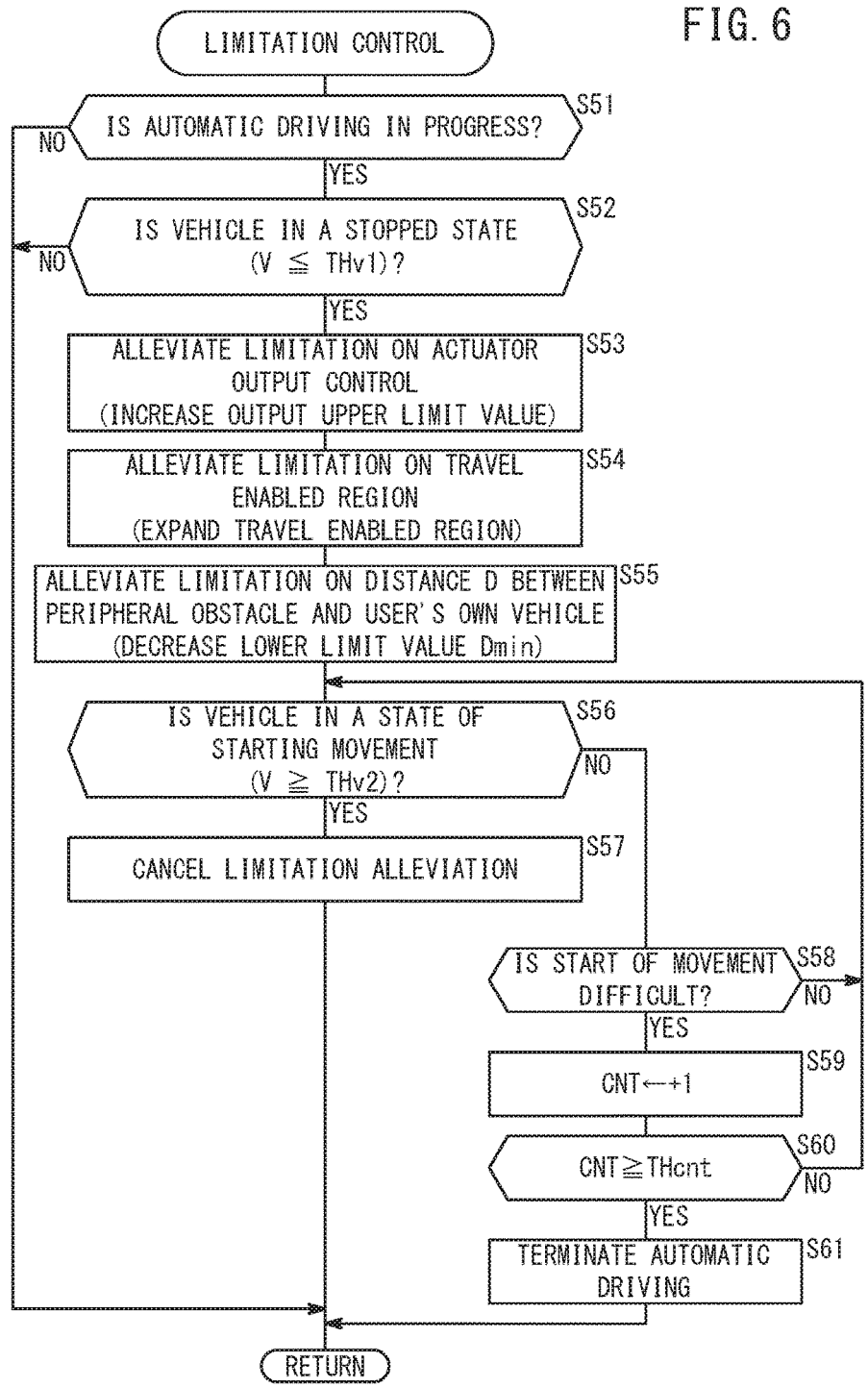

TRAVEL CONTROL DEVICE

CROSS-REFERENCE TO RELATED APPLICATION

This application is based upon and claims the benefit of priority from Japanese Patent Application No. 2016-176539 filed on Sep. 9, 2016, the contents of which are incorporated herein by reference.

BACKGROUND OF THE INVENTION

Field of the Invention

The present invention relates to a travel control device adapted to control automatic driving that assists driving operations of a driver, or automatic driving that enables traveling without requiring driving operations of the driver.

Description of the Related Art

Japanese Laid-Open Patent Publication No. 2015-153153 addresses the issue of providing a driving support device, a driving support method, and a program which are capable of preventing a discontinuation of automatic driving due to intervention of another vehicle between a preceding vehicle and the user's own vehicle (see paragraph [0005], abstract).

In order to solve this problem, in Japanese Laid-Open Patent Publication No. 2015-153153, a merging point determination means, and an inter-vehicle distance setting means are provided. In the case that the user's own vehicle is traveling under automatic driving, the merging point determination means determines on the basis of map information whether or not there is a merging point at which another vehicle merges in front of a road on which the user's own vehicle is traveling. If it is determined that there is not a merging point in front of the road on which the user's own vehicle is traveling, the inter-vehicle distance setting means sets the inter-vehicle distance between the preceding vehicle and the user's own vehicle to a first inter-vehicle distance, which makes it difficult for other vehicles to intervene therein. If it is determined that there is a merging point in front of the road on which the user's own vehicle is traveling, the inter-vehicle distance setting means sets the inter-vehicle distance between the preceding vehicle and the user's own vehicle to a second inter-vehicle distance, which is longer than the first inter-vehicle distance, and which allows another vehicle to make a predetermined lane change at the merging point, and easily enter between the preceding vehicle and the user's own vehicle.

SUMMARY OF THE INVENTION

As noted above, in Japanese Laid-Open Patent Publication No. 2015-153153, the inter-vehicle distance between the preceding vehicle and the user's own vehicle is switched depending on whether or not there is a merging point where another vehicle is capable of merging in front of the road on which the user's own vehicle is traveling. In Japanese Laid-Open Patent Publication No. 2015-153153, although a control is considered for a case in which the user's own vehicle does not perform a lane change, it is seen that no consideration is given to a case in which the user's own vehicle makes a lane change at the merging point.

In the case that the user's own vehicle changes lanes at the merging point, if the user's own vehicle behaves with excessive caution with respect to the movement of other vehicles, there is a concern that a state in which the user's own vehicle remains stopped will continue for a prolonged time period. Further, apart from a merging point, such a concern also applies to situations in which the user's own vehicle performs a lane change (including a right turn or a left turn) while taking into consideration the surrounding vehicles.

The present invention has been devised taking into consideration the aforementioned problems, and has the object of providing a travel control device, which enables automatic driving that is suitable in accordance with the vehicle velocity.

A travel control device according to the present invention is adapted to control automatic driving to assist driving operations of a driver, or to control automatic driving to enable traveling without requiring driving operations of the driver, wherein the travel control device is configured to set a limitation in relation to traveling of a vehicle during the automatic driving, and compared with a case in which the vehicle is not in a stopped state, or a case in which the vehicle is not in a slowly traveling state, or a case in which the vehicle velocity is in excess of a vehicle velocity threshold value by which the stopped state or the slowly traveling state is determined, the travel control device is configured to alleviate the limitation in a case in which the vehicle is in the stopped state or in a case in which the vehicle is in the slowly traveling state, or in a case in which the vehicle velocity is lower than the vehicle velocity threshold value.

According to the present invention, compared with the case in which the vehicle is not in the stopped state, or the case in which the vehicle is not in the slowly traveling state, or the case in which the vehicle velocity is in excess of the vehicle velocity threshold value by which the stopped state or the slowly traveling state is determined, the limitation in relation to traveling is alleviated in the case that the vehicle is in the stopped state or in the case that the vehicle is in the slowly traveling state, or in the case that the vehicle velocity is lower than the vehicle velocity threshold value. Consequently, automatic driving is enabled, which is suitable in accordance with the vehicle velocity (in particular, the stopped state or the slowly traveling state).

The vehicle velocity threshold value can be set to any value from 0 to 15 kilometers per hour (km/h), for example.

The travel control device may be configured to set an upper limit value of a vehicle body behavior amount in relation to start of movement, deceleration, or turning of the vehicle during the automatic driving. Further, compared with the case in which the vehicle is not in the stopped state, or the case in which the vehicle is not in the slowly traveling state, or the case in which the vehicle velocity is in excess of the vehicle velocity threshold value, the travel control device may be configured to alleviate the upper limit value of the vehicle body behavior amount in the case in which the vehicle is in the stopped state or in the case in which the vehicle is in the slowly traveling state, or in the case in which the vehicle velocity is lower than the vehicle velocity threshold value.

In accordance with this feature, in the stopped state or in the slowly traveling state of the vehicle, it is possible to increase the degree of freedom of the vehicle body behavior amount in relation to start of movement, deceleration, or turning. Consequently, in the stopped state or the slowly traveling state of the vehicle, it becomes easy to adapt to the surrounding traffic conditions, even in situations involving merging, turning to the right, or turning to the left, etc. As a result, the continuation of automatic driving is facilitated.

The vehicle body behavior amount can be, for example, one or more of a steering angle, a lateral acceleration, a yaw rate, a longitudinal acceleration, a vehicle velocity, and a longitudinal deceleration of the vehicle.

The travel control device may be configured to set a lower limit value of an interval between the vehicle and a peripheral obstacle during the automatic driving. Further, compared with the case in which the vehicle is not in the stopped state, or the case in which the vehicle is not in the slowly traveling state, or the case in which the vehicle velocity is in excess of the vehicle velocity threshold value, the travel control device may be configured to alleviate the lower limit value of the interval in the case in which the vehicle is in the stopped state or in the case in which the vehicle is in the slowly traveling state, or in the case in which the vehicle velocity is lower than the vehicle velocity threshold value.

In accordance with this feature, in the stopped state or in the slowly traveling state of the vehicle, it is possible to increase the degree of freedom of the interval between the vehicle and the peripheral obstacle. Consequently, in the stopped state or the slowly traveling state of the vehicle, it becomes easy to adapt to the surrounding traffic conditions, even in situations involving merging, turning to the right, or turning to the left, etc. For example, in the case of merging, merging becomes easier. As a result, the continuation of automatic driving is facilitated.

The interval can be set, for example, as a distance with respect to the peripheral obstacle, or a collision marginal time (TTC, time-to-collision).

The travel control device may be configured to set a travel enabled region in which the vehicle is capable of traveling in relation to a peripheral obstacle. Further, compared with the case in which the vehicle is not in the stopped state, or the case in which the vehicle is not in the slowly traveling state, or the case in which the vehicle velocity is in excess of the vehicle velocity threshold value, the travel control device may be configured to alleviate a limitation on the travel enabled region in the case in which the vehicle is in the stopped state or in the case in which the vehicle is in the slowly traveling state, or in the case in which the vehicle velocity is lower than the vehicle velocity threshold value.

In accordance with this feature, in the stopped state or in the slowly traveling state of the vehicle, it is possible to increase the degree of freedom of the travel enabled region. Consequently, in the stopped state or the slowly traveling state of the vehicle, it becomes easy to adapt to the surrounding traffic conditions, even in situations involving merging, turning to the right, or turning to the left, etc. For example, in the case of turning to the right when traveling on the left side of the road (in the left-hand traffic), it becomes easier to approach toward the right side of the travel lane. As a result, the continuation of automatic driving is facilitated.

In a case in which the vehicle turns to right, the travel control device may be configured to expand the travel enabled region on a right side, and in a case in which the vehicle turns to left, the travel control device may be configured to expand the travel enabled region on a left side. In accordance with this feature, in the case that the vehicle in a stopped state starts to move, it is easy to make a right turn or a left turn.

In a case in which the vehicle transitions from the stopped state to a state of starting movement, the travel control device may be configured to reduce an amount of alleviation of the limitation, or may be configured to cancel the alleviation of the limitation. In accordance with this feature, when the vehicle shifts to the state of starting movement, it is possible for the limitation to be applied in accordance with the vehicle velocity.

The travel control device may be configured to suspend automatic driving, in a case in which a time period, during which the vehicle is in a state in which it is difficult to start movement after having been in the stopped state, has exceeded a time period threshold value. Consequently, when it is difficult for start of movement to take place in automatic driving, the responsibility for driving can be entrusted to operations of the driver.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 6 is a flowchart of the limitation control of the embodiment.

DESCRIPTION OF THE PREFERRED EMBODIMENTS

A. Embodiment

<A-1. Configuration>
[A-1-1. Overall Configuration]

Figure 1:
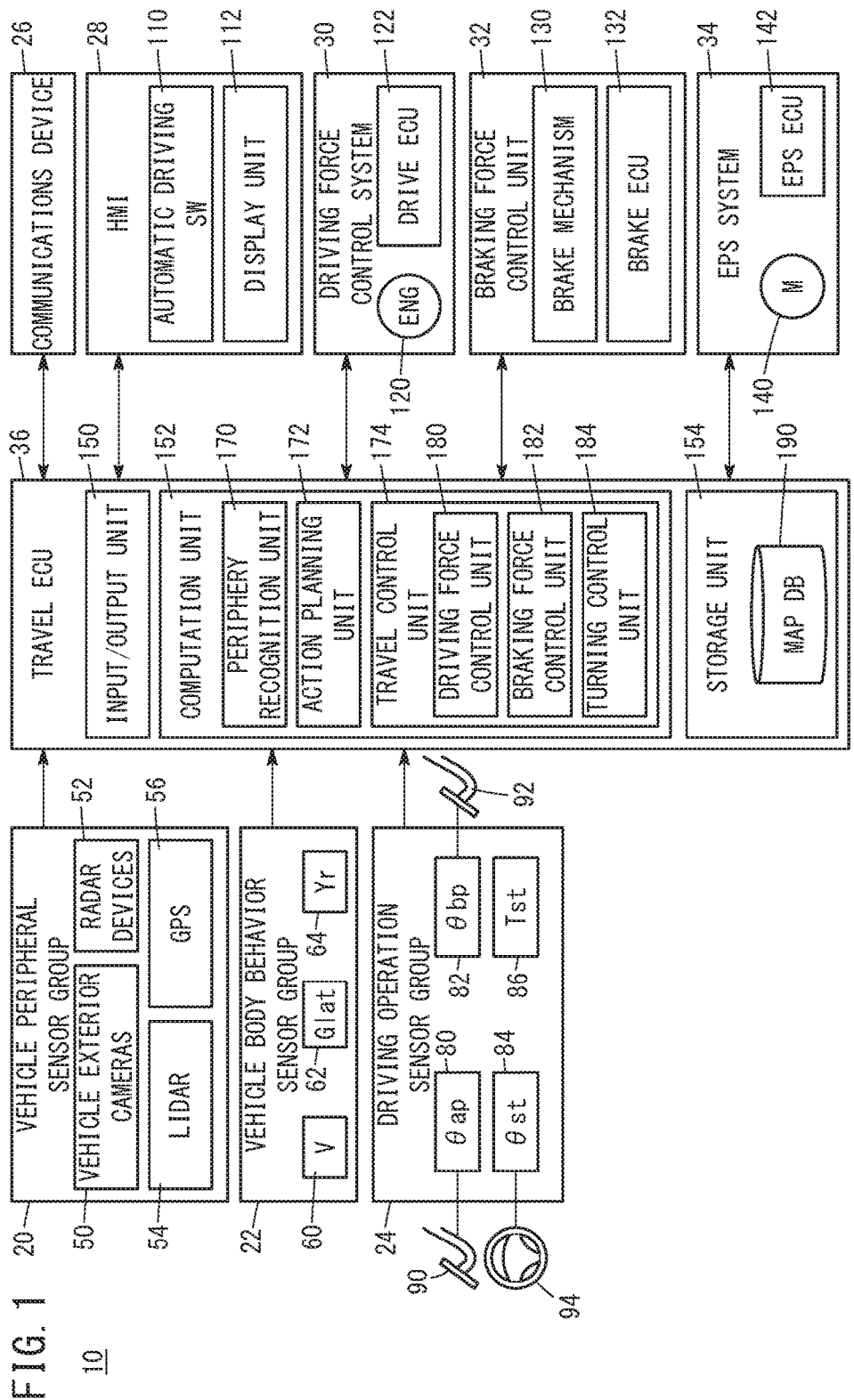
FIG. 1 is a block diagram showing a configuration of a vehicle including a travel electronic control unit serving as a travel control device according to an embodiment of the present invention.

FIG. 1 is a block diagram showing the configuration of a vehicle 10 including a travel electronic control unit 36 (hereinafter referred to as a "travel ECU 36" or an "ECU 36") as a travel control device according to an embodiment of the present invention. In addition to the travel ECU 36, the vehicle 10 (hereinafter also referred to as a "user's own vehicle 10") includes a vehicle peripheral sensor group 20, a vehicle body behavior sensor group 22, a driving operation sensor group 24, a communications device 26, a human-machine interface 28 (hereinafter referred to as an "HMI 28"), a driving force control system 30, a braking force control system 32, and an electric power steering system 34 (hereinafter referred to as an "EPS system 34").

[A-1-2. Vehicle Peripheral Sensor Group 20]

The vehicle peripheral sensor group 20 detects information in relation to the periphery of the vehicle 10 (hereinafter also referred to as "vehicle peripheral information Ic"). In the vehicle peripheral sensor group 20, there are included a plurality of vehicle exterior cameras 50, a plurality of radar devices 52, a LIDAR (Light Detection And Ranging) system 54, and a global positioning system sensor 56 (hereinafter referred to as a "GPS sensor 56").

The plurality of vehicle exterior cameras 50 output image information Iimage obtained by capturing images of the periphery (front, sides, and rear) of the vehicle 10. The plurality of radar devices 52 output radar information Iradar indicative of reflected waves with respect to electromagnetic waves transmitted around the periphery (front, sides, and rear) of the vehicle 10. The LIDAR system 54 continuously irradiates a laser in all directions of the vehicle 10, measures the three-dimensional position of reflection points based on the reflected waves, and outputs the measurements as three-dimensional information Ilidar. The GPS sensor 56 detects the current position Pcur of the vehicle 10. The vehicle exterior cameras 50, the radar devices 52, the LIDAR system 54, and the GPS sensor 56 serve as periphery recognition devices that recognize the vehicle peripheral information Ic.

[A-1-3. Vehicle Body Behavior Sensor Group 22]

The vehicle body behavior sensor group 22 detects information in relation to the behavior of the vehicle 10 (in particular, the vehicle body) (hereinafter also referred to as "vehicle body behavior information Ib"). The vehicle body behavior sensor group 22 includes a vehicle velocity sensor 60, a lateral acceleration sensor 62, and a yaw rate sensor 64.

The vehicle velocity sensor 60 detects the vehicle velocity V [km/h] of the vehicle 10. The lateral acceleration sensor 62 detects the lateral acceleration Glat [m/s/s] of the vehicle 10. The yaw rate sensor 64 detects the yaw rate Yr [rad/s] of the vehicle 10.

[A-1-4. Driving Operation Sensor Group 24]

The driving operation sensor group 24 detects information in relation to the driving operations performed by the driver (hereinafter also referred to as "driving operation information Io"). In the driving operation sensor group 24, there are included an accelerator pedal sensor 80, a brake pedal sensor 82, a steering angle sensor 84, and a steering torque sensor 86.

The accelerator pedal sensor 80 (hereinafter also referred to as an "AP sensor 80") detects an operation amount θap (hereinafter also referred to as an "AP operation amount θap") [%] of an accelerator pedal 90. The brake pedal sensor 82 (hereinafter also referred to as a "BP sensor 82") detects an operation amount θbp (hereinafter also referred to as a "BP operation amount θbp") [%] of a brake pedal 92. The steering angle sensor 84 detects a steering angle θst (hereinafter also referred to as an "operation amount θst") [deg] of a steering wheel 94. The steering torque sensor 86 detects a steering torque Tst [N·m] applied to the steering wheel 94.

[A-1-5. Communications Device 26]

The communications device 26 performs wireless communications with an external device. In this instance, the external device may include, for example, a non-illustrated traffic information server. The traffic information server supplies traffic information such as congestion information, accident information, construction information, and the like to respective vehicles 10. Alternatively, the external device may include a non-illustrated route guidance server. Instead of the travel ECU 36, the route guidance server generates or calculates a planned route Rv up to a target point Pgoal on the basis of the current position Pcur and the target point Pgoal of the vehicle 10, which are received from the communications device 26.

Moreover, although it is assumed that the communications device 26 of the present embodiment is mounted (or fixed at all times) in the vehicle 10, the communications device 26 may be, for example, a device that can be carried to locations outside of the vehicle 10, such as a mobile phone or a smart phone.

[A-1-6. HMI 28]

The HMI 28 accepts operations input from a vehicle occupant, together with presenting various information to the vehicle occupant visually, audibly, and tactilely. The HMI 28 includes an automatic driving switch 110 (hereinafter also referred to as an "automatic driving SW 110"), and a display unit 112. The automatic driving SW 110 is a switch for issuing instructions by operations of the vehicle occupant to both initiate and terminate an automatic driving control. In addition to or in place of the automatic driving SW 110, it is also possible to instruct the initiation and termination of the automatic driving control by other methods (such as voice input via a non-illustrated microphone). The display unit 112 includes, for example, a liquid crystal panel or an organic EL panel. The display unit 112 may also be configured in the form of a touch panel.

[A-1-7. Driving Force Control System 30]

The driving force control system 30 includes an engine 120 (drive source) and a drive electronic control unit 122 (hereinafter referred to as a "drive ECU 122"). The aforementioned AP sensor 80 and the accelerator pedal 90 may be considered as components of the driving force control system 30. The drive ECU 122 executes a driving force control for the vehicle 10 using the AP operation amount θap, etc. When the driving force control is implemented, the drive ECU 122 controls a travel driving force Fd of the vehicle 10 through the control of the engine 120.

[A-1-8. Braking Force Control System 32]

The braking force control system 32 includes a brake mechanism 130 and a brake electronic control unit 132 (hereinafter referred to as a "brake ECU 132"). The aforementioned BP sensor 82 and the brake pedal 92 may be considered as components of the braking force control system 32. The brake mechanism 130 actuates a brake member by a brake motor (or a hydraulic mechanism) or the like.

The brake ECU 132 executes a braking force control for the vehicle 10 using the BP operation amount θbp, etc. When the braking force control is implemented, the brake ECU 132 controls the braking force Fb of the vehicle 10 through the control of the brake mechanism 130, etc.

[A-1-9. EPS System 34]

The EPS system 34 includes an EPS motor 140 and an EPS electronic control unit 142 (hereinafter referred to as an "EPS ECU 142" or an "ECU 142"). The aforementioned steering angle sensor 84, the steering torque sensor 86, and the steering wheel 94 may be considered as components of the EPS system 34.

The EPS ECU 142 controls the EPS motor 140 according to commands from the travel ECU 36, and thereby controls a turning amount R of the vehicle 10. In the turning amount R, there are included the steering angle θst, the lateral acceleration Glat, and the yaw rate Yr.

[A-1-10. Travel ECU 36]

(A-1-10-1. Outline of Travel ECU 36)

The travel ECU 36 executes the automatic driving control for driving the vehicle 10 to the target point Pgoal without requiring driving operations made by the driver, and for example, includes a central processing unit (CPU). The ECU 36 includes an input/output unit 150, a computation unit 152, and a storage unit 154.

Moreover, portions of the functions of the travel ECU 36 can be borne by an external device existing externally of the vehicle 10. For example, the vehicle 10 itself may be configured not to include an action planning unit 172 and/or a map database 190, to be described later, and to acquire the planned route Rv and/or the map information Imap from the aforementioned route guidance server.

(A-1-10-2. Input/Output Unit 150)

The input/output unit 150 performs input and output operations with respect to devices apart from the ECU 36 (the sensor groups 20, 22, 24, the communications device 26, etc.). The input/output unit 150 includes a non-illustrated A/D conversion circuit that converts input analog signals into digital signals.

(A-1-10-3. Computation Unit 152)

The computation unit 152 carries out calculations based on signals received from the sensor groups 20, 22, 24, the communications device 26, the HMI 28, and the ECUs 122, 132, 142, etc. In addition, based on the calculation results thereof, the computation unit 152 generates and outputs signals with respect to the communications device 26, the drive ECU 122, the brake ECU 132, and the EPS ECU 142.

As shown in FIG. 1, the computation unit 152 of the travel ECU 36 includes a periphery recognition unit 170, the action planning unit 172, and a travel control unit 174. These respective components are realized by executing a program stored in the storage unit 154. The program may be supplied from an external device via the communications device 26. Portions of the program may also be constituted by hardware (circuit components).

Figure 4:
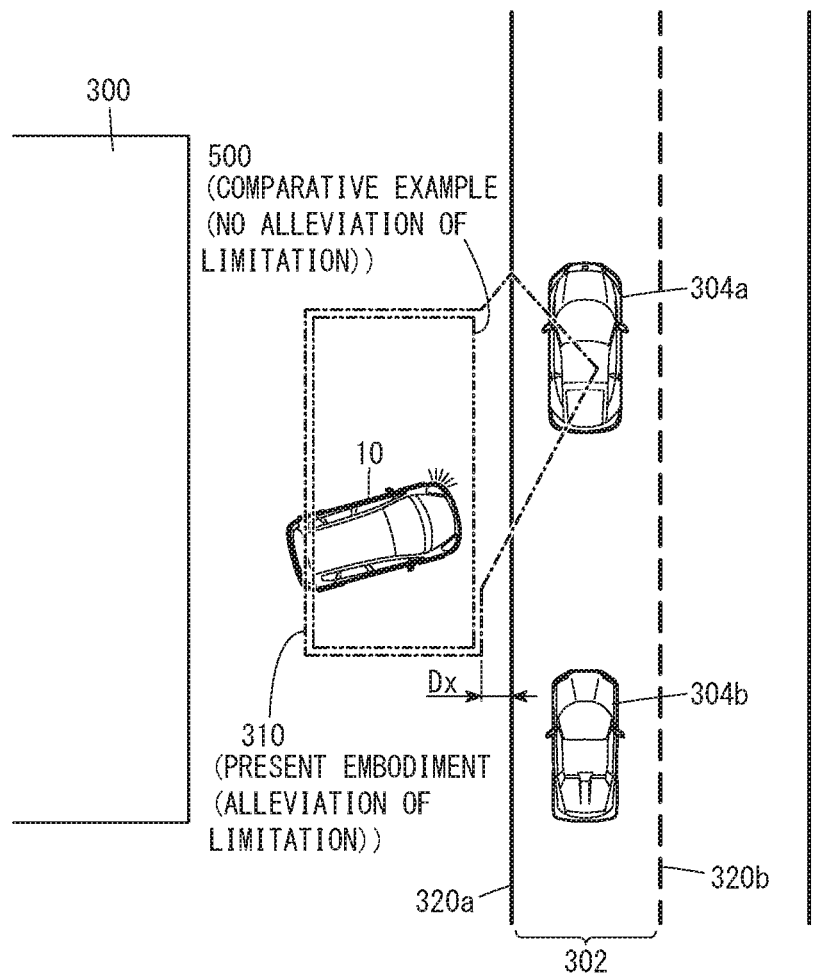
FIG. 4 is a first explanatory diagram for explaining a limitation control in the embodiment.

The periphery recognition unit 170 recognizes lane markings (lane markings 320a, 320b and the like, as shown in FIG. 4) and peripheral obstacles (other vehicles 304a, 304b and the like, as shown in FIG. 4) on the basis of the vehicle peripheral information Ic received from the vehicle peripheral sensor group 20. For example, the lane markings are recognized based on the image information Iimage. Based on the recognized lane markings, the periphery recognition unit 170 recognizes the travel lane of the vehicle 10 (a travel lane 302 shown in FIG. 4, etc.).

Further, the peripheral obstacles are recognized using the image information Iimage, the radar information Iradar, and the three-dimensional information Ilidar. Among the peripheral obstacles, there are included moving objects such as other vehicles (the other vehicles 304a, 304b, etc., shown in FIG. 4), and stationary objects such as buildings, signs (for example, traffic signals), and the like. In the case that the peripheral obstacle is a traffic signal, the periphery recognition unit 170 determines the color of the traffic signal.

Through the HMI 28, the action planning unit 172 calculates the planned route Rv for the user's own vehicle 10 up to the target point Pgoal, and performs route guidance along the planned route Rv.

The travel control unit 174 controls the outputs of each of respective actuators that control the vehicle body behavior. Among such actuators, there are included the engine 120, the brake mechanism 130, and the EPS motor 140. By controlling the outputs of the actuators, the travel control unit 174 controls behavior amounts (hereinafter referred to as "vehicle body behavior amounts Qb") of the vehicle 10 (in particular, the vehicle body).

Among the vehicle body behavior amounts Qb referred to herein, there are included the vehicle velocity V, a longitudinal acceleration $\alpha$ (hereinafter also referred to as an "acceleration $\alpha$") [m/s/s], a longitudinal deceleration $\beta$ (hereinafter also referred to as a "deceleration $\beta$") [m/s/s], a steering angle $\theta$st, a lateral acceleration Glat, and a yaw rate Yr. The acceleration $\alpha$ and the deceleration $\beta$ can be calculated as time differential values of the vehicle velocity V.

The travel control unit 174 includes a driving force control unit 180, a braking force control unit 182, and a turning control unit 184. The driving force control unit 180 primarily controls the output of the engine 120, and thereby controls the travel driving force Fd (or the acceleration $\alpha$) of the vehicle 10. The braking force control unit 182 primarily controls the output of the brake mechanism 130, and thereby controls the braking force Fb (or deceleration $\beta$) of the vehicle 10. The turning control unit 184 primarily controls the output of the EPS motor 140, and thereby controls the turning amount R (or the steering angle $\theta$st, the lateral acceleration Glat, and the yaw rate Yr) of the vehicle 10.

(A-1-10-4. Storage Unit 154)

The storage unit 154 stores programs and data (including the map database 190) used by the computation unit 152. Road map information (map information Imap) is stored in the map database 190 (hereinafter referred to as a "map DB 190"). In the map information Imap, there is included road information Iroad concerning the shapes of roads and the like.

The storage unit 154 includes, for example, a random access memory (hereinafter referred to as a "RAM"). As the RAM, a volatile memory such as a register or the like, and a nonvolatile memory such as a flash memory or the like can be used. Further, in addition to the RAM, the storage unit 154 may have a read only memory (hereinafter referred to as a "ROM").

<A-2. Automatic Driving Control of the Present Embodiment>

[A-2-1. Outline of Automatic Driving Control of the Present Embodiment]

As described above, the travel ECU 36 of the present embodiment executes the automatic driving control. In the automatic driving control, the vehicle 10 is driven to a target point Pgoal without requiring driving operations made by the driver. However, in the automatic driving control, if the driver operates the accelerator pedal 90, the brake pedal 92, or the steering wheel 94, such operations may be reflected in the driving. In the automatic driving control according to the present embodiment, the automatic driving force control, the automatic braking force control, and the automatic turning control are used in combination.

The automatic driving force control automatically controls the travel driving force Fd of the vehicle 10. The automatic braking force control automatically controls the braking force Fb of the vehicle 10. The automatic turning control automatically controls turning of the vehicle 10. Turning of the vehicle 10 as referred to herein includes not only the case of traveling on a curved road, but also right and left turning of the vehicle 10, as well as making a change of a travel lane, merging into another lane, and maintenance of the travel lane. Moreover, turning for the purpose of maintaining the travel lane implies turning (or steering) of the vehicle 10 in a vehicle widthwise direction, so as to maintain the vehicle 10 at a reference position (for example, a center position in the vehicle widthwise direction).

The automatic driving force control automatically causes the vehicle 10 to undergo traveling by controlling the travel driving force Fd. At this time, the ECU 36 sets a target value (for example, a target engine torque) of the travel driving force Fd, and controls an actuator (the engine 120) in accordance with the target value. Further, the ECU 36 sets an upper limit value $\alpha$max (hereinafter also referred to as a "longitudinal acceleration upper limit value $\alpha$max" or an "acceleration upper limit value $\alpha$max") of the longitudinal acceleration $\alpha$ of the vehicle 10, and controls the travel driving force Fd so that the longitudinal acceleration $\alpha$ does not exceed the upper limit value $\alpha$max. As will be discussed later, the acceleration upper limit value $\alpha$max is made variable in accordance with the vehicle velocity V.

The automatic braking force control decelerates the vehicle 10 by controlling the braking force Fb of the vehicle 10. At this time, the ECU 36 sets a target value (for example, a target deceleration βtar) of the braking force Fb, and controls an actuator (the brake mechanism 130) in accordance with the target value. Further, the ECU 36 sets an upper limit value θmax (hereinafter also referred to as a "deceleration upper limit value βmax") of the deceleration β of the vehicle 10, and controls the braking force Fb so that the deceleration β does not exceed the upper limit value βmax (so that deceleration does not take place too rapidly). As will be discussed later, the deceleration upper limit value βmax is made variable in accordance with the vehicle velocity V.

In the automatic turning control, the turning amount R of the vehicle 10 is controlled in order to turn the vehicle 10. At this time, the ECU 36 sets a target value of the turning amount R (for example, a target steering angle θsttar or a target lateral acceleration Glattar), and controls an actuator (the EPS motor 140) in accordance with the target value. Further, the ECU 36 sets an upper limit value Rmax (hereinafter also referred to as a "turning amount upper limit value Rmax") of the turning amount R of the vehicle 10, and controls the turning amount R so that the turning amount R does not exceed the upper limit value Rmax. The upper limit value Rmax of the turning amount, for example, is used in the form of an upper limit value θstmax (hereinafter also referred to as a "steering angle upper limit value θstmax") of the steering angle θst, or an upper limit value Glatmax (hereinafter referred to as a "lateral acceleration upper limit value Glatmax") of the lateral acceleration Glat. As will be discussed later, the turning amount upper limit value Rmax is made variable in accordance with the vehicle velocity V.

[A-2-2. Overall Flow of Automatic Driving Control of the Present Embodiment]

Figure 2:
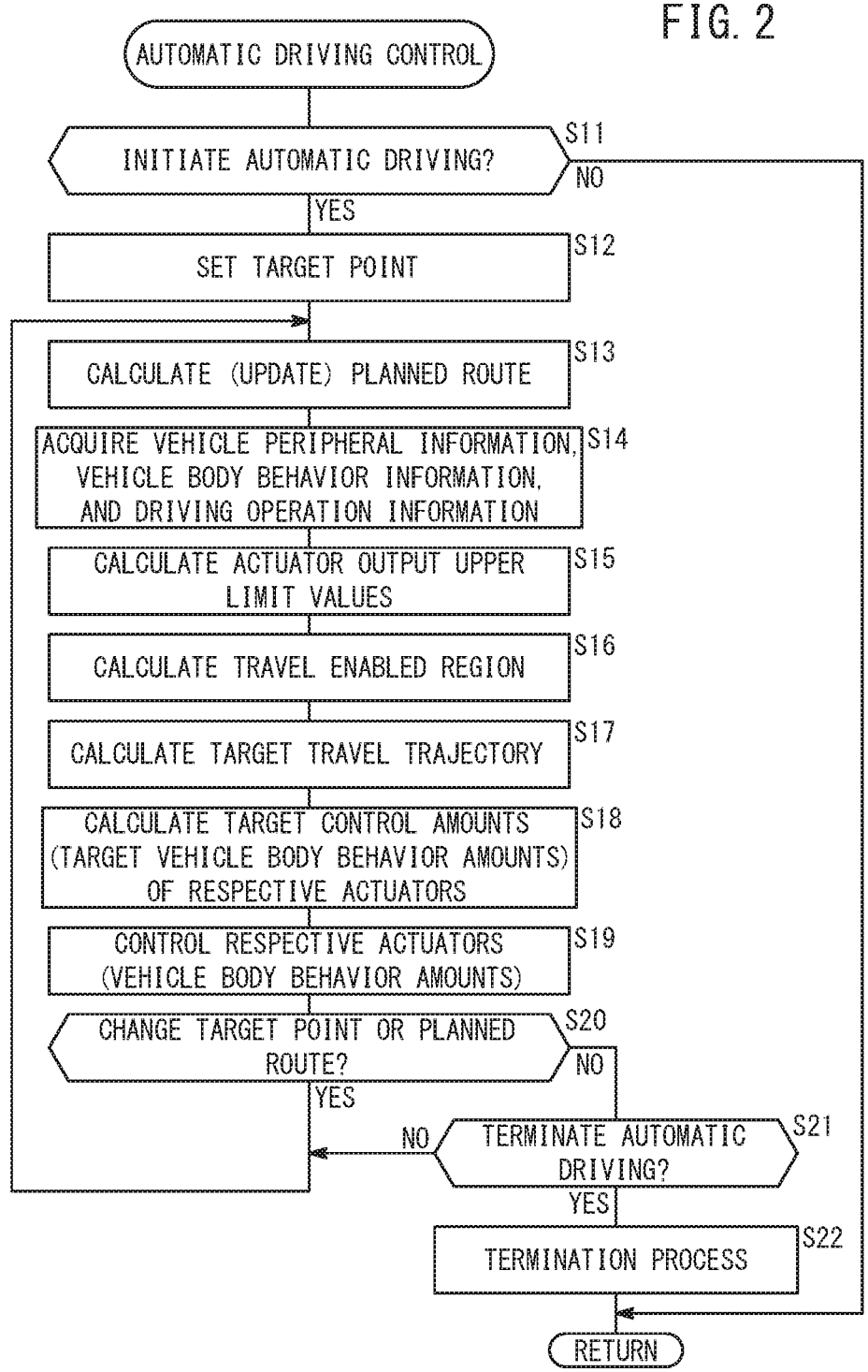
FIG. 2 is a flowchart showing the overall flow of an automatic driving control according to the embodiment.

FIG. 2 is a flowchart showing the overall flow of the automatic driving control according to the present embodiment. In step S11, the travel ECU 36 determines whether or not to initiate automatic driving. For example, the ECU 36 determines whether or not the automatic driving switch 110 (see FIG. 1) has been switched from off to on. In the case that automatic driving is to be initiated (step S11: YES), the process proceeds to step S12. In the case that automatic driving is not to be initiated (step S11: NO), the current process is terminated, and after a predetermined time period has elapsed, the process returns to step S11.

In step S12, the ECU 36 sets the target point Pgoal. More specifically, an input of the target point Pgoal from a user (driver, etc.) is received via the HMI 28. In step S13, the ECU 36 calculates a planned route Rv from the current position Pcur to the target point Pgoal. Moreover, in the event that step S13 is performed after the later-described step S21, the ECU 36 updates the planned route Rv.

In step S14, the ECU 36 acquires from the respective sensor groups 20, 22, 24 the vehicle peripheral information Ic, the vehicle body behavior information Ib, and the driving operation information Io. As noted above, in the vehicle peripheral information Ic, there are included the image information Iimage from the vehicle exterior cameras 50, the radar information Iradar from the radar devices 52, the three-dimensional information Ilidar from the LIDAR system 54, and the current position Pcur from the GPS sensor 56. In the vehicle body behavior information Ib, there are included the vehicle velocity V from the vehicle velocity sensor 60, the lateral acceleration Glat from the lateral acceleration sensor 62, and the yaw rate Yr from the yaw rate sensor 64. In the driving operation information Io, there are included the AP operation amount θap from the AP sensor 80, the BP operation amount θbp from the BP sensor 82, the steering angle θst from the steering angle sensor 84, and the steering torque Tst from the steering torque sensor 86.

In step S15, the ECU 36 calculates output upper limit values Pmax for each of the actuators. Among such actuators, there are included the engine 120, the brake mechanism 130, and the EPS motor 140.

Further, the upper limit value Pmax of the output Peng of the engine 120 (hereinafter also referred to as an "output upper limit value Pengmax"), for example, is an upper limit value of the torque of the engine 120. The upper limit value Pmax of the output Pb of the brake mechanism 130 (hereinafter also referred to as an "output upper limit value Pbmax"), for example, is an upper limit value of the braking force Fb. The upper limit value Pmax of the output Peps of the EPS motor 140 (hereinafter also referred to as an "output upper limit value Pepsmax"), for example, is an upper limit value of the torque of the EPS motor 140. By using these output upper limit values Pmax (Pengmax, Pbmax, Pepsmax), it is possible to avoid excessive outputs, and the riding comfort or the like of the vehicle occupants can be increased.

The output upper limit values Pmax are calculated based on the upper limit values Qbmax of the vehicle body behavior amounts Qb. In step S15 of the present embodiment, a limitation control is implemented to switch the output upper limit values Pmax depending on the vehicle velocity V (details of this feature will be described later with reference to FIGS. 4 to 6).

In step S16, the ECU 36 calculates a travel enabled region (a travel enabled region 310 shown in FIG. 4, etc.). The travel enabled region is indicative of a region within which the vehicle 10 is capable of traveling at the present time. For example, a region is indicated in which the distance between the vehicle 10 and each of respective peripheral objects is greater than or equal to a predetermined value, with reference to a reference point of the vehicle 10 (for example, the center of gravity of the vehicle 10, or the center of a line segment connecting the left and right rear wheels). Alternatively, the vehicle 10 may be represented by a rectangle as viewed in plan, and for each of the four corners of such a rectangle, a region may be used in which the distance to each of the respective peripheral objects is greater than or equal to a predetermined value.

In calculating the travel enabled region, a relationship of the vehicle 10 with the peripheral obstacles (in particular, front obstacles) (the other vehicles 304a, 304b in FIG. 4, etc.) is also taken into consideration. The ECU 36 performs a periphery monitoring control in relation to the peripheral obstacles. The periphery monitoring control will be described later with reference to FIG. 3.

Moreover, in the case that the periphery recognition unit 170 recognizes a red light, an area ahead of a stop line in front of the traffic light can be excluded from the travel enabled region. Alternatively, the travel enabled region may be calculated simply on the basis of a relationship (distance or the like) with the peripheral objects, and a travel restriction in accordance with the red light may be reflected when calculating a target travel trajectory Ltar, as will be described later.

Further, in step S16 of the present embodiment, a limitation control is implemented to switch the travel enabled region depending on the vehicle velocity V (details of this feature will be described later with reference to FIGS. 4 to 6).

In step S17, the ECU 36 calculates the target travel trajectory Ltar (hereinafter also referred to as a "target trajectory Ltar"). The target trajectory Ltar is a target value of the travel trajectory L for the vehicle 10. In the present embodiment, an optimal trajectory is selected as the target trajectory Ltar from among travel trajectories L in the travel enabled region that satisfy various conditions.

In step S18, the ECU 36 calculates, on the basis of the target trajectory Ltar, target control amounts (in other words, target vehicle body behavior amounts Qbtar) for the respective actuators. In the target vehicle body behavior amounts Qbtar, there are included, for example, a target longitudinal acceleration αtar, a target longitudinal deceleration βtar, and a target lateral acceleration Glattar.

In step S19, using the target control amounts calculated in step S18, the ECU 36 controls the respective actuators (in other words, the vehicle body behavior amounts Qb). For example, the driving force control unit 180 calculates a target output Pengtar (for example, a target engine torque) for the engine 120 (actuator) so as to realize the target longitudinal acceleration αtar. In addition, the driving force control unit 180 controls the engine 120 via the drive ECU 122 so as to realize the target output Pengtar.

Further, the braking force control unit 182 calculates the target output Pbtar of the brake mechanism 130 (actuator) so as to realize the target longitudinal deceleration βtar. In addition, the braking force control unit 182 controls the brake mechanism 130 via the brake ECU 132 so as to realize the target output Pbtar.

Furthermore, the turning control unit 184 sets the target steering angle θsttar so as to realize the target lateral acceleration Glattar. In addition, the turning control unit 184 controls the EPS motor 140 (actuator) via the EPS ECU 142 so as to realize the target steering angle θsttar. Moreover, in addition to or instead of carrying out turning by way of the EPS motor 140, it is also possible to cause the vehicle 10 to turn (so-called torque vectoring) by way of a torque difference between the left and right wheels.

In step S20, the ECU 36 determines whether or not to change the target point Pgoal or the planned route Rv. The case of changing the target point Pgoal is a case in which a new target point Pgoal is input through operation of the HMI 28. The case of changing the planned route Rv, for example, is a case in which traffic congestion occurs in the planned route Rv, and thus it becomes necessary to set a detour route. The occurrence of traffic congestion can be recognized, for example, using congestion information acquired from the traffic information server via the communications device 26.

If the target point Pgoal or the planned route Rv is changed (step S20: YES), the process returns to step S13 and a planned route Rv is calculated on the basis of the new target point Pgoal, or a new planned route Rv is calculated. If the target point Pgoal or the planned route Rv is not changed (step S20: NO), the process proceeds to step S21.

In step S21, the travel ECU 36 determines whether or not to terminate automatic driving. Termination of automatic driving takes place, for example, in the case that the vehicle 10 has arrived at the target point Pgoal, or in the case that the automatic driving switch 110 has been switched from on to off. Alternatively, if the surrounding environment has become an environment in which automatic driving is difficult, the ECU 36 terminates automatic driving.

In the case that automatic driving is not terminated (step S21: NO), the process returns to step S13, and the ECU 36 updates the planned route Rv based on the current position Pcur. In the case that automatic driving is to be terminated (step S21: YES), the process proceeds to step S22.

In step S22, the ECU 36 executes a termination process. More specifically, if the vehicle 10 has arrived at the target point Pgoal, the ECU 36 notifies the driver, etc., via the HMI 28 and by way of voice, a display, or the like that the vehicle 10 has arrived at the target point Pgoal. In the event that the automatic driving switch 110 is switched from ON to OFF, the ECU 36 notifies the driver, etc., via the HMI 28 and by way of voice, a display, or the like that automatic driving is to be terminated. If the surrounding environment has become an environment in which driving is difficult, the ECU 36 notifies the driver, etc., of that fact via the HMI 28 and by way of voice, a display, or the like.

[A-2-3. Periphery Monitoring Control (Part of Step S16 of FIG. 2)]

As described above, when calculating the travel enabled region (step S16 of FIG. 2), the ECU 36 executes the periphery monitoring control. The periphery monitoring control is a control which is carried out to avoid contact with surrounding obstacles (the other vehicle 304a in FIG. 4, etc.) that exist in the vicinity (particularly in front) of the vehicle 10.

Figure 3:
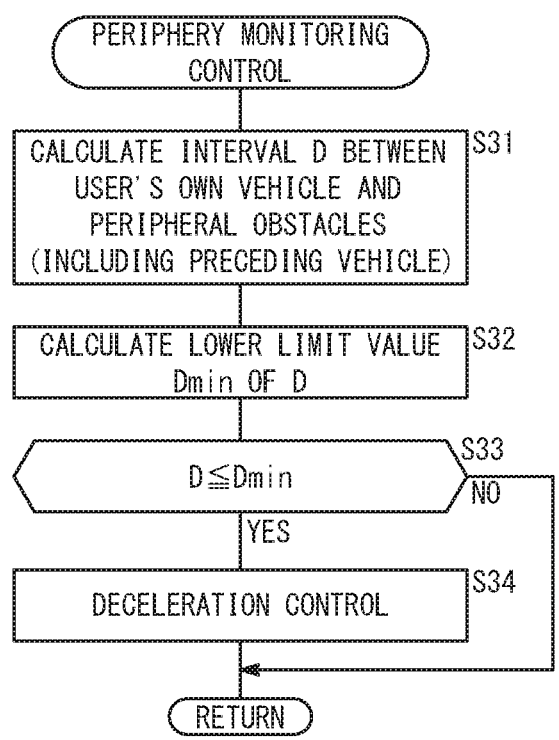
FIG. 3 is a flowchart of a periphery monitoring control in the embodiment.

FIG. 3 is a flowchart of a periphery monitoring control in the present embodiment. In step S31, the ECU 36 calculates the distance D between the user's own vehicle 10 and peripheral obstacles that exist in the vicinity of the user's own vehicle 10 (including a preceding vehicle that is present in the same travel lane as the user's own vehicle 10). In this instance, the interval D is defined, for example, as a distance [m] or a TTC [sec] with respect to the peripheral obstacles.

In step S32, the ECU 36 calculates a lower limit value Dmin of the interval D. In step S32 of the present embodiment, the ECU 36 implements a limitation control to calculate the lower limit value Dmin on the basis of the vehicle velocity V (details of this feature will be described later with reference to FIG. 6).

In step S33, the ECU 36 determines whether or not the interval D is less than or equal to the lower limit value Dmin. If the interval D is less than or equal to the lower limit value Dmin (step S33: YES), then in step S34, the ECU 36 executes a deceleration control in order to decelerate the user's own vehicle 10. In the deceleration control of the present embodiment, the travel enabled region is set narrowly so that the distance D to the peripheral obstacles is extended. Alternatively, in the deceleration control, the respective actuators (in particular, the engine 120 and the brake mechanism 130) may be controlled so as to simply reduce the vehicle velocity V. Moreover, in the case that the user's own vehicle 10 is already in a stopped state, the ECU 36 maintains the stopped state.

[A-2-4. Limitation Control (Part of Step S15 of FIG. 2, Part of Step S16, Part of Step S32 of FIG. 3)]

(A-2-4-1. Basic Concept)

(A-2-4-1-1. Application Scenario 1)

FIG. 4 is a first explanatory diagram for explaining the limitation control according to the present embodiment. In FIG. 4, a situation is shown in which the user's own vehicle 10 is approaching toward the lane 302 in order to enter into the lane 302 from a parking lot 300 (the user's own vehicle 10 is in a stopped state in FIG. 4). The other vehicles 304a, 304b (vehicles traveling straight ahead) are traveling in the lane 302 into which the user's own vehicle 10 is planning to enter. The lane 302 is specified by the lane markings 320a and 320b. In FIG. 4, a travel enabled region 500 pertains to a comparative example, whereas the travel enabled region 310 pertains to the present embodiment.

In the comparative example, regardless of the vehicle velocity V, the upper limit value αmax of the acceleration α is kept constant. Further, except when the user's own vehicle 10 is actually moving forward toward the new lane 302, a predetermined distance Dx is set to remain with respect to the lane marking 320a. Therefore, in the case that the other vehicle 304b, which acts as an obstacle to the user's own vehicle 10, is present, the travel enabled region 500, which is calculated from the upper limit value αmax, is set to be comparatively narrow in the travel direction of the vehicle 10 (in the example of FIG. 4, the travel enabled region 500 is set so as to stop before the lane 302, taking into consideration the presence of the other vehicle 304b). In this manner, when the travel enabled region 500 becomes narrowed as described above, it is impossible for the user's own vehicle 10 to easily enter into the lane 302, and smooth driving of the user's own vehicle 10 becomes difficult.

Thus, according to the present embodiment, if the vehicle 10 is in a stopped state, the limitation on the acceleration upper limit value αmax (as well as the predetermined distance Dx) is alleviated. Consequently, the travel enabled region 310, which is calculated from the alleviated upper limit value αmax, can be set to be comparatively wider in the travel direction of the vehicle 10, even in the case that the other vehicle 304b is present which can act as an obstacle with respect to the user's own vehicle 10. More specifically, even in the case that the other vehicle 304b exists in the lane 302, by having increased the acceleration upper limit value αmax, the user's own vehicle 10 is capable of entering into the lane 302 between the other vehicle 304a and the other vehicle 304b. Accordingly, smooth driving is made possible.

(A-2-4-1-2. Application Scenario 2)

Figure 5:
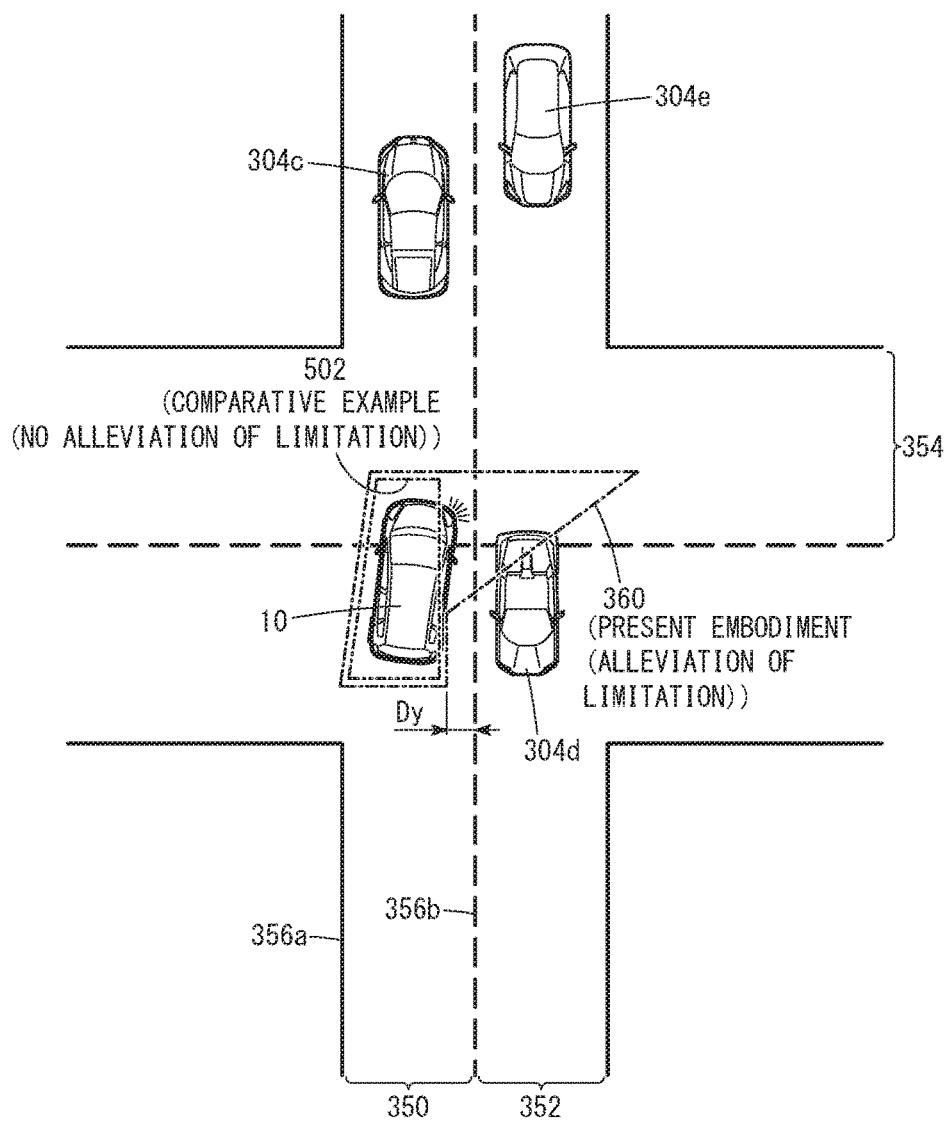
FIG. 5 is a second explanatory diagram for explaining the limitation control in the embodiment.

FIG. 5 is a second explanatory diagram for explaining a limitation control according to the present embodiment. In FIG. 5, a situation is shown in which the user's own vehicle 10 is stopped in a travel lane 350 with the intention of entering into a new travel lane 354 by making a right turn in the current travel lane 350. Another vehicle 304c (preceding vehicle) is traveling in the travel lane 350 of the user's own vehicle 10, and other vehicles 304d, 304e (oncoming vehicles) are traveling in an opposite lane 352. In FIG. 5, a travel enabled region 502 pertains to a comparative example, whereas a travel enabled region 360 pertains to the present embodiment.

In the comparative example, regardless of the vehicle velocity V, the upper limit value αmax of the acceleration α is kept constant. Further, in the case that the user's own vehicle 10 is traveling in the travel lane 350, and except when the user's own vehicle 10 is actually making a left turn or a right turn, a predetermined distance Dy is set to with respect to lane markings 356a, 356b. Consequently, in the case that the other vehicles 304d, 304e, which act as obstacles with respect to the user's own vehicle 10, are present, the travel enabled region 502, which is calculated from the upper limit value αmax, is set to be comparatively narrow in the travel direction of the user's own vehicle 10. In this manner, when the travel enabled region 502 becomes narrowed as described above, it is impossible for the user's own vehicle 10 to enter into the new travel lane 354, and smooth driving of the user's own vehicle 10 becomes difficult.

Thus, according to the present embodiment, if the user's own vehicle 10 is in a stopped state, the limitation on the acceleration upper limit value αmax and the predetermined distance Dy is alleviated. Consequently, the travel enabled region 360, which is calculated from the alleviated upper limit value αmax, can be set to be comparatively wider in the travel direction of the user's own vehicle 10, even in the case that the other vehicles 304d, 304e are present which can act as obstacles with respect to the user's own vehicle 10. More specifically, even in the case that the other vehicles 304d, 304e exist in the opposite lane 352, by having increased the acceleration upper limit value αmax, the user's own vehicle 10 is capable of turning and passing between the other vehicle 304d and the other vehicle 304e. Accordingly, smooth driving is made possible.

(A-2-4-2. Specific Example of Limitation Control)

FIG. 6 is a flowchart of the limitation control according to the present embodiment. As noted previously, the limitation control is executed as a part of step S15 of FIG. 2, a part of step S16, and a part of step S32 of FIG. 3. In FIG. 6, the part of step S15 of FIG. 2, the part of step S16, and the part of step S32 of FIG. 3 are shown collectively in the form of a single flowchart, however, it would also be possible to divide these parts into separate flowcharts.

In step S51 of FIG. 6, the travel ECU 36 determines whether or not automatic driving is in progress. More specifically, the ECU 36 determines whether or not the automatic driving switch 110 is on. In the case that automatic driving is in progress (step S51: YES), the process proceeds to step S52. In the case that automatic driving is not in progress (step S51: NO), the current process is terminated, and after a predetermined time period has elapsed, the process returns to step S51.

In step S52, the ECU 36 determines whether or not the vehicle velocity V is less than or equal to a first vehicle velocity threshold value THv1. The first vehicle velocity threshold value THv1 (hereinafter also referred to as a "threshold value THv1") is a threshold value for determining whether or not the vehicle 10 is in a stopped state, and for example, is a fixed value set within a range of 0 to 5 km/h. If the vehicle velocity V is less than or equal to the threshold value THv1 (step S52: YES), the process proceeds to step S53. In the case that the vehicle velocity V is not less than or equal to the threshold value THv1 (step S52: NO), the current process is terminated, and after a predetermined time period has elapsed, the process returns to step S51.

In step S53, the ECU 36 alleviates the limitation on the actuator output control. More specifically, the respective output upper limit values Pmax are increased. As noted previously, among the actuators referred to herein, there are included the engine 120, the brake mechanism 130, and the EPS motor 140.

In step S54, the ECU 36 alleviates the limitation on the travel enabled region, and expands the travel enabled region. In this instance, the alleviation of the limitation on the travel enabled region includes alleviation of a limitation accompanying the output upper limit values Pmax of the actuators (for example, accompanying an increase in the acceleration upper limit value αmax) (see FIGS. 4 and 5).

In addition, in the case that the user's own vehicle 10 merges into another lane, or in the case that the user's own vehicle 10 makes a right turn or a left turn (FIG. 5), in the alleviation on the travel enabled region, there is included a reduction in the distances Dx, Dy from the lane markings (the lane markings 320a, 356b shown in FIGS. 4 and 5, etc.) with reference to the stopped position of the user's own vehicle 10. Moreover, although a case of turning to the right has been described in FIG. 5, in the case of making a left turn as well, it is also possible to set the stopped position with reference to the lane markings. In this case, the lane markings are not limited to lanes that define a travel lane, but may also be lanes that define a sidewalk or the like.

In step S55, the ECU 36 alleviates the limitation on the distance D between the peripheral obstacle and the user's own vehicle 10, and decreases (or makes relatively smaller)

the lower limit value Dmin. As noted previously, the lower limit value Dmin is used in the periphery monitoring control (see FIG. 3).

In step S56, the ECU 36 determines whether or not the vehicle velocity V is greater than or equal to a second vehicle velocity threshold value THv2. The second vehicle velocity threshold value THv2 (hereinafter also referred to as a "threshold value THv2") is a threshold value for determining whether or not the vehicle 10 is in a state of starting movement, and is a value (for example, a fixed value set within a range of 5 to 15 km/h) that is larger than the first vehicle velocity threshold value THv1 (Thv2>THv1).

If the vehicle velocity V is greater than or equal to the threshold value THv2 (step S56: YES), the ECU 36 cancels the alleviation of the limitation in step S57. More specifically, the ECU 36 returns to a state prior to performing the processes of steps S53 to S55. At this time, the ECU 36 need not immediately return to the state prior to performing the processes of steps S53 to S55, but may return to such a state after a predetermined time period Px has elapsed. Further, when canceling the alleviation of the limitation, the ECU 36 need not immediately reduce the amount of alleviation to zero, but may gradually reduce the amount of alleviation in a stepwise manner.

If the vehicle velocity V is not greater than or equal to the threshold value THv2 (step S56: NO), the stopped state of the vehicle 10 is continued. In this case, in step S58, the ECU 36 determines whether or not the user's own vehicle 10 is in a situation where start of movement thereof is difficult. The situation where start of movement is difficult as referred to herein, for example, includes a case in which, since a large number of surrounding vehicles are present, the user's own vehicle 10 cannot merge into the flow of traffic.

In the case that the user's own vehicle 10 is in a situation where start of movement is difficult (step S58: YES), then in step S59, the ECU 36 increments a count value CNT by 1. In the following step S60, the ECU 36 determines whether or not the count value CNT is greater than or equal to a counter threshold value THcnt. The counter threshold value THcnt is a threshold value for confirming the determination that the user's own vehicle 10 is in a situation where start of movement is difficult.

If the count value CNT is greater than or equal to the counter threshold value THcnt (step S60: YES), then in step S61, the ECU 36 terminates automatic driving. More specifically, since the user's own vehicle 10 is in a situation where start of movement thereof is difficult, the ECU 36 notifies the driver via the HMI 28, and by way of voice, a display, or the like, that the driver's should take over driving of the user's own vehicle 10. In addition, in the case that the driver takes over driving, automatic driving is terminated.

Moreover, when the vehicle 10 is involved in a traffic jam, the ECU 36 may suspend the processes of steps S58 to S60. Whether or not the vehicle 10 is involved in a traffic jam can be determined based on traffic information from the traffic information server (not shown) via the communications device 26, for example.

In step S58, if the user's own vehicle 10 is not in a situation where start of movement thereof is difficult (step S58: NO), or in step S60, if the count value CNT is not greater than or equal to the counter threshold value THcnt (step S60: NO), the process returns to step S56.

<A-3. Advantages and Effects of the Present Embodiment>

As has been described above, according to the present embodiment, compared with a case in which the vehicle 10 is not in a stopped state (or a case in which the vehicle velocity V is in excess of the first vehicle velocity threshold value THv1), the limitation in relation to traveling is alleviated in the case that the vehicle 10 is in a stopped state (or in the case that the vehicle velocity V is lower than the first vehicle velocity threshold value THv1) (see FIG. 6). Consequently, automatic driving is enabled, which is suitable in accordance with the vehicle velocity V (in particular, a stopped state).

In the present embodiment, the ECU 36 (travel control device) sets the output upper limit values Pmax of the actuators (upper limit values Qmax of the vehicle body behavior amounts Qb in relation to start of movement, deceleration, or turning of the vehicle 10) during automatic driving (step S15 of FIG. 2). Further, compared with a case in which the vehicle 10 is not in a stopped state (or a case in which the vehicle velocity V is in excess of the first vehicle velocity threshold value THv1), the ECU 36 alleviates the output upper limit values Pmax of the actuators (upper limit values Qmax of the vehicle body behavior amounts Qb) in the case that the vehicle 10 is in a stopped state (or in the case that the vehicle velocity V is lower than the first vehicle velocity threshold value THv1) (see FIG. 6).

In accordance with this feature, in a stopped state of the vehicle 10, it is possible to increase the degree of freedom of the actuator outputs (vehicle body behavior amounts Qb) in relation to start of movement, deceleration, or turning. Consequently, in a stopped state of the vehicle 10, it becomes easy to adapt to the surrounding traffic conditions, even in situations involving merging, turning to the right, or turning to the left, etc. (see FIGS. 4 and 5). As a result, the continuation of automatic driving is facilitated.

In the present embodiment, the ECU 36 (travel control device) sets the lower limit value Dmin of an interval D of the vehicle 10 with respect to peripheral obstacles (a preceding vehicle, etc.) during automatic driving (step S32 of FIG. 3). Further, compared with a case in which the vehicle 10 is not in a stopped state (or a case in which the vehicle velocity V is in excess of the first vehicle velocity threshold value THv1), the ECU 36 alleviates the lower limit value Dmin in the case that the vehicle 10 is in a stopped state (or in the case that the vehicle velocity V is lower than the first vehicle velocity threshold value THv1) (step S55 of FIG. 6).

In accordance with this feature, in a stopped state of the vehicle 10, it is possible to increase the degree of freedom of the interval D between the vehicle 10 and the peripheral obstacles. Consequently, in the stopped state of the vehicle 10, it becomes easy to adapt to the surrounding traffic conditions, even in situations involving merging, turning to the right, or turning to the left, etc. For example, in the case of merging, merging becomes easier. As a result, the continuation of automatic driving is facilitated.

In the present embodiment, the ECU 36 (travel control device) sets the travel enabled regions 310, 360 in which the vehicle 10 is capable of traveling in relation to the other vehicles 304a to 304e (peripheral obstacles) (step S16 of FIG. 2, FIGS. 4 and 5). Further, compared with a case in which the vehicle 10 is not in a stopped state (or a case in which the vehicle velocity V is in excess of the first vehicle velocity threshold value THv1), the ECU 36 alleviates the limitation on the travel enabled regions in the case that the vehicle 10 is in a stopped state (or in the case that the vehicle velocity V is lower than the first vehicle velocity threshold value THv1) (step S54 of FIG. 6).

In accordance with this feature, in a stopped state of the vehicle 10, it is possible to increase the degree of freedom of the travel enabled regions. Consequently, in the stopped state of the vehicle 10, it becomes easy to adapt to the surrounding traffic conditions, even in situations involving merging, turning to the right, or turning to the left, etc. For example, in the case of turning to the right when traveling on the left side of the road (i.e., in the left-hand traffic), it becomes easier to approach toward the right side of the travel lane 350 (see FIG. 5). As a result, the continuation of automatic driving is facilitated.

In the present embodiment, in the case that the vehicle 10 turns to the right, the travel enabled region is expanded on the right side, and in the case that the vehicle 10 turns to the left, the travel enabled region is expanded on the left side (see FIG. 5). In accordance with this feature, in the case that the vehicle 10 in a stopped state starts to move, it is easy to make a right turn or a left turn.

In the present embodiment, in the case that the vehicle 10 transitions from the stopped state to a state of starting movement (step S56 of FIG. 6: YES), the ECU 36 (travel control device) cancels the alleviation of the limitation (step S57). In accordance with this feature, when the vehicle 10 shifts to the state of starting movement, it is possible for the limitation to be applied in accordance with the vehicle velocity V.

In the present embodiment, the ECU 36 (travel control device) terminates or suspends automatic driving (step S61), in the case that the count value CNT (time period), during which the vehicle 10 is in a state (step S58: YES) in which it is difficult to start movement after having been in the stopped state (step S52 in FIG. 6: YES), has exceeded the counter threshold value THcnt (time period threshold value) (step S60: YES). Consequently, when it is difficult for start of movement to take place in automatic driving, the responsibility for driving can be entrusted to operations of the driver.

B. Modifications

The present invention is not limited to the embodiment described above, and various modified or additional configurations could be adopted therein based on the content of the present specification. For example, the following configurations can be adopted.

<B-1. Objects to which the Invention can be Applied>

In the embodiment described above, it was assumed that the travel ECU 36 (travel control device) was used in a vehicle 10 such as an automobile (or car) (see FIG. 1). However, for example, from the standpoint of alleviating limitations in relation to traveling in the case that the vehicle 10 is in a stopped state or a slowly traveling state, the invention is not limited to this feature. For example, the vehicle 10 (or conveyance) may be a moving object such as a ship, an aircraft, or the like. Alternatively, concerning the vehicles 10, other devices can also be used (for example, various manufacturing devices, or robots).

<B-2. Configuration of Vehicle 10>

[B-2-1. Sensor Groups 20, 22, 24]

The vehicle peripheral sensor group 20 of the present embodiment includes the plurality of vehicle exterior cameras 50, the plurality of radar devices 52, the LIDAR system 54, and the GPS sensor 56 (see FIG. 1). However, for example, from the standpoint of detecting travel lanes (or lane markings) such as the lane 302 shown in FIG. 4, and peripheral obstacles (such as the other vehicles 304a, 304b shown in FIG. 4), the present invention is not limited to this feature. In the case that the plurality of vehicle exterior cameras 50 include a stereo camera adapted to detect a region in front of the vehicle 10, the radar devices 52 and/or the LIDAR system 54 can be omitted.

The vehicle body behavior sensor group 22 according to the above-described embodiment includes the vehicle velocity sensor 60, the lateral acceleration sensor 62, and the yaw rate sensor 64 (see FIG. 1). However, for example, from the standpoint of alleviating limitations in relation to traveling in the case that the vehicle 10 is in a stopped state or a slowly traveling state, the invention is not limited to this feature. For example, it is possible to eliminate one or more of the lateral acceleration sensor 62 and the yaw rate sensor 64.

The driving operation sensor group 24 according to the above-described embodiment includes the AP sensor 80, the BP sensor 82, the steering angle sensor 84, and the steering torque sensor 86 (see FIG. 1). However, for example, from the standpoint of alleviating limitations in relation to traveling in the case that the vehicle 10 is in a stopped state or a slowly traveling state, the invention is not limited to this feature. For example, it is possible for one or more of the AP sensor 80, the BP sensor 82, the steering angle sensor 84, and the steering torque sensor 86 to be omitted.

[B-2-2. Actuators]

According to the above-described embodiment, the engine 120, the brake mechanism 130, and the EPS motor 140 are used as actuators that serve as targets for the automatic driving control (see FIG. 1). However, for example, from the standpoint of alleviating limitations in relation to traveling during automatic driving corresponding to a stopped state or a slowly traveling state of the vehicle, the invention is not limited to this feature. For example, one or two of the engine 120, the brake mechanism 130, and the EPS motor 140 can be excluded from being targets of the automatic driving control. In the case that any one of the actuators is excluded from being the target of the automatic driving control, the driver carries out the control of that actuator that was removed from being the target. Furthermore, as described above, in place of the EPS motor 140, it is also possible to perform turning using a torque difference between the left and right wheels.

<B-3. Control by the Travel ECU 36>

According to the above-described embodiment, a description has been given concerning automatic driving that does not require driving operations of the driver for acceleration, deceleration, and turning of the vehicle 10 (see FIG. 2). However, for example, from the standpoint of alleviating limitations in relation to traveling during automatic driving corresponding to a stopped state or a slowly traveling state of the vehicle, the invention is not limited to this feature. For example, the present invention can also be applied to automatic driving that does not require driving operations of the driver for only one or two of acceleration, deceleration, and turning of the vehicle 10, or to automatic driving in which driving operations of the driver are assisted.

According to the above-described embodiment, a determination is made as to whether or not alleviation of the limitation in relation to traveling of the vehicle 10 is required (steps S53 to S55), on the basis of whether or not the vehicle 10 is in a stopped state (step S52 in FIG. 6). However, for example, from the standpoint of alleviating limitations in relation to traveling when the vehicle 10 is traveling at a comparatively low velocity, the present invention is not limited to this feature. For example, the ECU 36 can also determine whether or not alleviation of the limitation in relation to traveling of the vehicle 10 is required (steps S53 to S55), on the basis of whether or not the vehicle 10 is in a stopped state or a slowly traveling state. In this case, the first vehicle velocity threshold value THv1 in step S52 of FIG. 6 may be set to a threshold value (for example, a fixed value set within a range of 0 to 15 km/h) for determining whether or not the vehicle 10 is in a stopped state or a slowly traveling state.

According to the above-described embodiment, whether or not alleviation of the limitation in relation to traveling of the vehicle 10 is necessary (steps S53 to S55 of FIG. 6) is determined on the basis of only the vehicle velocity V (steps S52 and S56). However, for example, from the standpoint of alleviating limitations in relation to traveling in the case that the vehicle 10 is in a stopped state or a slowly traveling state, the invention is not limited to this feature. For example, the aforementioned limitation may be alleviated for a predetermined time period after the vehicle 10 has been brought into a stopped state or a slowly traveling state. Alternatively, it is also possible for the aforementioned limitation to be alleviated for a predetermined time period after the vehicle 10 has completed the stopped state or the slowly traveling state.

In the above-described embodiment, a case has been described in which the vehicle 10 travels on the left side of the road (in the left-hand traffic, see FIGS. 4 and 5). However, for example, from the standpoint of alleviating limitations in relation to traveling in the case that the vehicle 10 is in a stopped state or a slowly traveling state, the invention is not limited to this feature. The present invention is also applicable to a case in which the vehicle 10 travels on the right side of the road (i.e., right-hand traffic).

<B-4. Other Considerations>

In the above-described embodiment, cases exist in which an equal sign is included or not included in the numerical comparisons (such as steps S33 of FIG. 3, steps S52 and S56 of FIG. 6). However, for example, if there is no special reason for including or excluding such an equal sign (or stated otherwise, for cases in which the effects of the present invention are obtained), it can be set arbitrarily as to whether to include an equal sign in the numerical comparisons.

As to what this implies, for example, the determination as to whether or not the interval D in step S33 of FIG. 3 is less than or equal to the lower limit value Dmin (D≤Dmin) can be changed to a determination as to whether or not the interval D is less than the lower limit value Dmin (D<Dmin).

Further, the same applies to a case in which the first vehicle velocity threshold value THv1 in step S52 of FIG. 6 is a (non-zero) positive value (THv1>0). More specifically, the determination as to whether or not the vehicle velocity V in step S52 is less than or equal to the threshold value THv1 (V≤THv1) can be changed to a determination as to whether or not the vehicle velocity V is less than the threshold value THv1 (V<THv1). On the other hand, in the case that the first vehicle velocity threshold value THv1 is zero (THv1=0), it is necessary for the determination in step S52 to be a determination based on whether or not the vehicle velocity V is less than or equal to the threshold value THv1 (or whether or not the vehicle velocity V is equal to the threshold value THv1).

C. Description of Reference Characters

10 . . . vehicle
36 . . . ECU (travel control device)
310, 360 . . . travel enabled region
350 . . . travel lane
CNT . . . count value (time)
D . . . interval
Dmin . . . lower limit value of interval
Glat . . . lateral acceleration (vehicle body behavior amount)
Qb . . . vehicle body behavior amount
Qbmax . . . upper limit value of vehicle body behavior amount
THcnt . . . counter threshold value (time threshold value)
THv1 . . . first vehicle velocity threshold value (vehicle velocity threshold value)
V . . . vehicle velocity (vehicle body behavior amount)
Yr . . . yaw rate (vehicle body behavior amount)
α . . . longitudinal acceleration (vehicle body behavior amount)
αmax . . . longitudinal acceleration upper limit value (upper limit value of vehicle body behavior amount)
β . . . longitudinal deceleration (vehicle body behavior amount)

What is claimed is:

1. A travel control device that controls automatic driving to assist driving operations of a driver, or controls automatic driving to enable traveling without requiring driving operations of the driver, comprising:
  a processor; and
  a memory that stores executable instructions that, when executed by the processor, facilitate performance of operations, comprising:
  setting an upper limitation of a vehicle body behavior amount in relation to start, deceleration, or turning of a vehicle during the automatic driving;
  in response to determining that the vehicle velocity is in excess of a vehicle velocity threshold value or not, alleviating the upper limitation of a vehicle body behavior amount based on the vehicle being in a stopped state, or based on the vehicle velocity being lower than the vehicle velocity threshold value;
  limiting a travel enabled region in which the vehicle is capable of traveling in accordance with a detection of a stop signal of a traffic light; and
  initiating a movement, deceleration, or turning of the vehicle in response to alleviating the limitation,
  wherein the vehicle body behavior amount includes a yaw rate of the vehicle.

2. The travel control device according to claim 1, wherein the operations further comprise:
  setting a lower limit value of an interval between the vehicle and a peripheral obstacle during the automatic driving; and
  in response to determining the vehicle is not in the stopped state, or in response to determining the vehicle velocity is in excess of the vehicle velocity threshold value, alleviating the lower limit value of the interval based on the vehicle being in the stopped state, or based on the vehicle velocity being lower than the vehicle velocity threshold value.

3. The travel control device according to claim 1, wherein the operations further comprise:
  setting the travel enabled region in which the vehicle is capable of traveling in relation to a peripheral obstacle; and
  in response to determining the vehicle is not in the stopped state, or in response to determining the vehicle velocity is in excess of the vehicle velocity threshold value, alleviating a limitation on the travel enabled region based on the vehicle being in the stopped state, or based on the vehicle velocity being lower than the vehicle velocity threshold value.

4. The travel control device according to claim 3, wherein the operations further comprise:
  in response to determining the vehicle is turning right, expanding the travel enabled region on a right side; and in response to determining the vehicle is turning left, expanding the travel enabled region on a left side.

5. The travel control device according to claim 1, wherein the operations further comprise, in response to determining the vehicle is transitioning from the stopped state to a state of starting movement, reducing an amount of alleviation of the limitation or canceling the alleviation of the limitation.

6. The travel control device according to claim 1, wherein the operations further comprise suspending the automatic driving based on a time period, during which the vehicle immobile after having been in the stopped state, has exceeded a time period threshold value.

7. The travel control device according to claim 3, wherein the alleviation of the limitation on the travel enabled region includes a reduction in a distance from a lane marking as a reference position at which the vehicle is to stop.

\* \* \* \* \*